United States Patent [19]

Yamano et al.

[11] Patent Number: 4,618,012
[45] Date of Patent: Oct. 21, 1986

[54] COMBINATION WEIGHING MACHINE

[75] Inventors: Shoji Yamano, Akashi; Yoshitaka Mikata, Himeji; Osamu Teramoto, Akashi; Kazuhiro Nishide, Kobe, all of Japan

[73] Assignee: Yamato Scale Company, Limited, Japan

[21] Appl. No.: 691,388

[22] Filed: Jan. 14, 1985

[51] Int. Cl.⁴ .................. G01G 19/00; G01G 19/22; G01G 13/00
[52] U.S. Cl. ........................................ 177/25; 177/1; 177/103
[58] Field of Search ................ 177/56, 57, 103, 104, 177/114, 1, 25, DIG. 12, 70

[56] References Cited

U.S. PATENT DOCUMENTS

| 3,217,927 | 11/1965 | Bale, Jr. et al. | 177/70 X |
|---|---|---|---|
| 4,267,894 | 5/1981 | Hirano | 177/25 |
| 4,308,928 | 1/1982 | Oshima | 177/25 |
| 4,437,527 | 3/1984 | Omae et al. | 177/25 |
| 4,446,938 | 5/1984 | Kawanishi | 177/25 |
| 4,473,126 | 9/1984 | Hirano | 177/25 X |
| 4,534,430 | 8/1985 | Steel | 177/25 |

FOREIGN PATENT DOCUMENTS

| 74260 | 3/1983 | European Pat. Off. | 177/103 |
|---|---|---|---|
| 131020 | 8/1982 | Japan | 177/25 |

Primary Examiner—Joseph W. Hartary
Assistant Examiner—Patrick W. Foster
Attorney, Agent, or Firm—Senniger, Powers, Leavitt and Roedel

[57] ABSTRACT

A combination weighing machine, which is used typically for packing a plurality of articles in each bag or the like so as to render the total weight of each bag to satisfy a predetermined weight condition, including a plurality of weighing units for weighing the articles each at the same time, arithmetic means for selecting some of these units the total weight of which satisfies the predetermined weight condition, and means for unloading the selected weighing units for delivery of the articles for packing and then loading them with new articles; each adjoining pair of weighing units being provided with a common auxiliary hopper for receiving weighed articles from either unit of the pair and keeping them for participating in the combination selecting operation together with those articles on the weighing units, thereby improving weighing accuracy without increasing the number of expensive weighing units.

7 Claims, 8 Drawing Figures

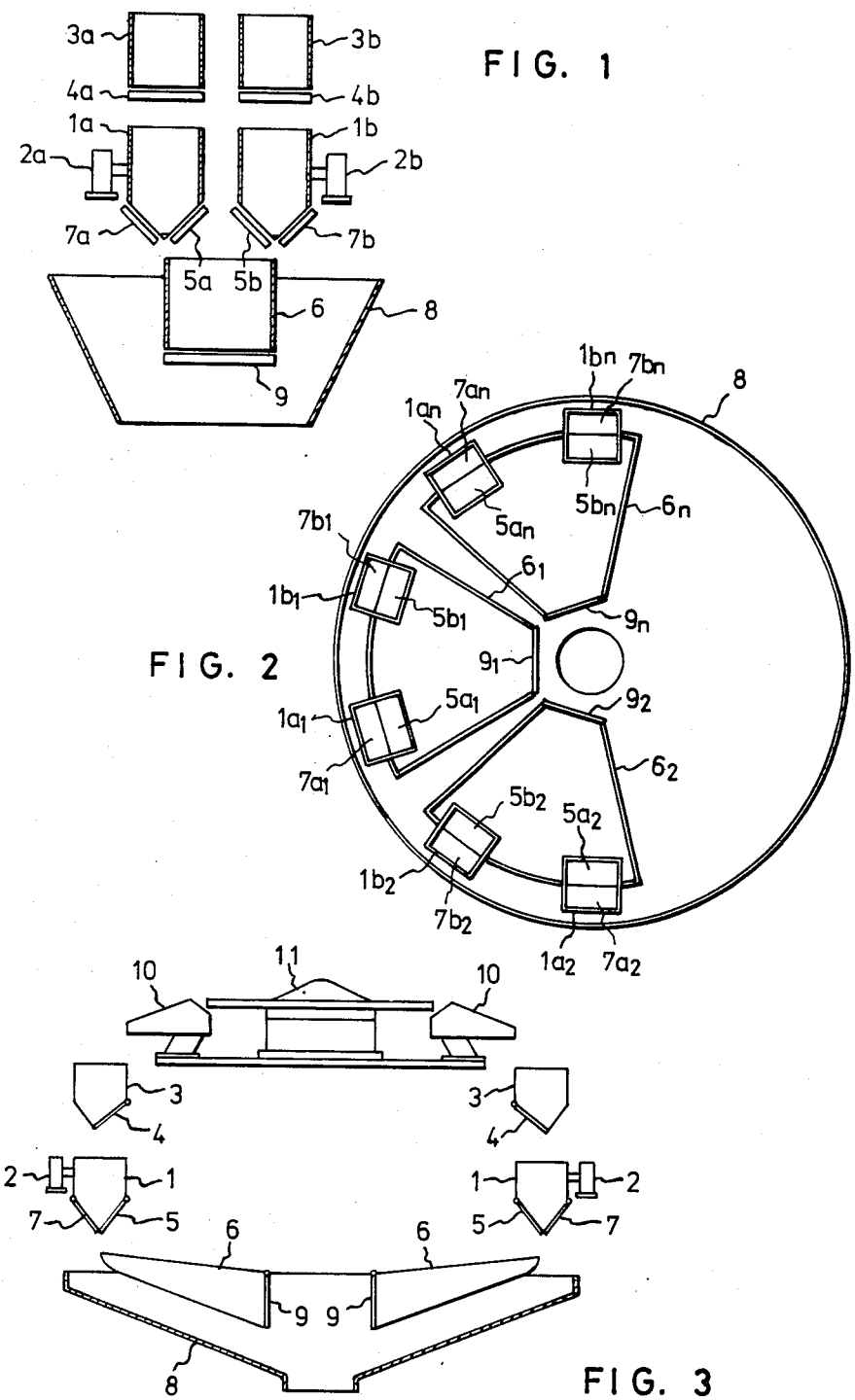

COMBINATION WEIGHING MACHINE

This invention relates to a combination weighing machine, especially, to one having auxiliary hoppers.

The weighing device, which is generally referred to as "combination balance" or "combination weighing machine" is used for extracting a plurality of articles from a group of articles, such as candies, fruits or vegetables, having relatively large variances in their unit weights, to form a subgroup or batch having a weight which is substantially equal to a predetermined target weight or, in general, which satisfies a predetermined condition. An example of such a device is described in U.S. Pat. No. 4,267,894. The device comprises a plurality of weighing units each including a relatively delicate and expensive weighing balance and accompanying weight sensor. It can be easily understood that it is possible to increase the accuracy of the batch weights with respect to a target weight by increasing the number of weighing units. However, increasing the number of weighing units results necessarily in an unwanted increase of the machine price. In order to overcome this problem, an idea was proposed in U.S. Pat. No. 4,308,928. The combination weighing machine of this patent includes a single weighing unit, a plurality of holding hoppers and corresponding memories for storing weight information of the articles in the respective hoppers, and effects a combination selecting operation with the contents of these memories. Although this machine significantly reduced the number of expensive weighing units, it required a bulky distributing mechanism for distributing the batches of articles successively weighed by the single weighing unit to the respective holding hoppers. This has resulted in an unwanted increase in the overall size and weight of the machine and, further has reduced working efficiency due to the length of required time for distributing the articles to empty hoppers.

Another idea for overcoming these problems was proposed in U.S. Pat. Nos. 4,437,527 and 4,446,938. The combination weighing machines of these patents each include a plurality of weighing units, and each weighing unit is provided with one or more auxiliary holding hoppers and corresponding memories, so that the weighed batch is transferred to the auxiliary hopper or hoppers and a combination is selected from these hoppers as well as the weighing balances. Although this idea could attain an effect equivalent to doubling or trebling the number of weighing units in regard to the working efficiency and weighing accuracy, it could not remove the problem of mechanical complication and difficulty of service and maintenance.

Accordingly, an object of this invention is to provide an improved combination weighing machine which preserves the advantage of the prior art machine having auxiliary holding hoppers but substantially reduces the abovementioned problem thereof.

This object can be attained in accordance with this invention, which provides a combination weighing machine comprising a plurality of weighing units for weighing articles, and weighing unit being adapted to produce a weight signal indicative of a weight of articles, a plurality of holding hoppers for receiving weighed articles from said weighing unit and holding them, a plurality of memories associated with said hoppers for storing the weight signals corresponding to their contents, means for combining the weight signals of said weighing units and said holding hoppers to select a combination of weight signals whose sum satisfies a predetermined weight condition, means for unloading the weighing units and/or the holding hoppers corresponding to the selected weight signals, and transfer means responsive to the unloading of said holding hoppers for transferring to unload hoppers articles from respective weighing units and for writing the weight signals of said articles in the memories of respective holding hoppers.

As a feature of this invention, each holding hopper is common to at least two weighing units, and said transfer means responds to the unloading of a holding hopper to transfer thereto the content of either of its two weighing units.

As understood from the above, this invention increases the number of weight signals which can participate in the combination selection (by a fraction of the number of weighing units) compared to earlier machines having no holding hoppers. For example, when the machine has ten weighing units and five holding hoppers, that is, each holding hopper is common to two weighing units, the number of weight signals which can be selected for combination will be fifteen.

This invention also reduces the number of holding hoppers associated with each weighing unit as compared to the machines of U.S. Pat. Nos. 4,437,527 and 4,446,938. This has significantly simplified the economical structure of the machine, without significantly reducing its working efficiency and weighing accuracy.

Now, the invention will be described in detail with reference to the accompanying drawings.

In the drawings:

FIG. 1 is a schematic sectional side view representing a part of an embodiment of a combination weighing machine according to this invention, showing the positional relationship between essential mechanical components thereof;

FIG. 2 is a schematic plan view, parts omitted, the embodiment of FIG. 1, showing an arrangement of essential components;

FIG. 3 is a schematic side view representing the overall mechanical arrangement of the embodiment of FIG. 1;

Throughout the drawings, same reference numerals are given to like structural components.

Figure 4:
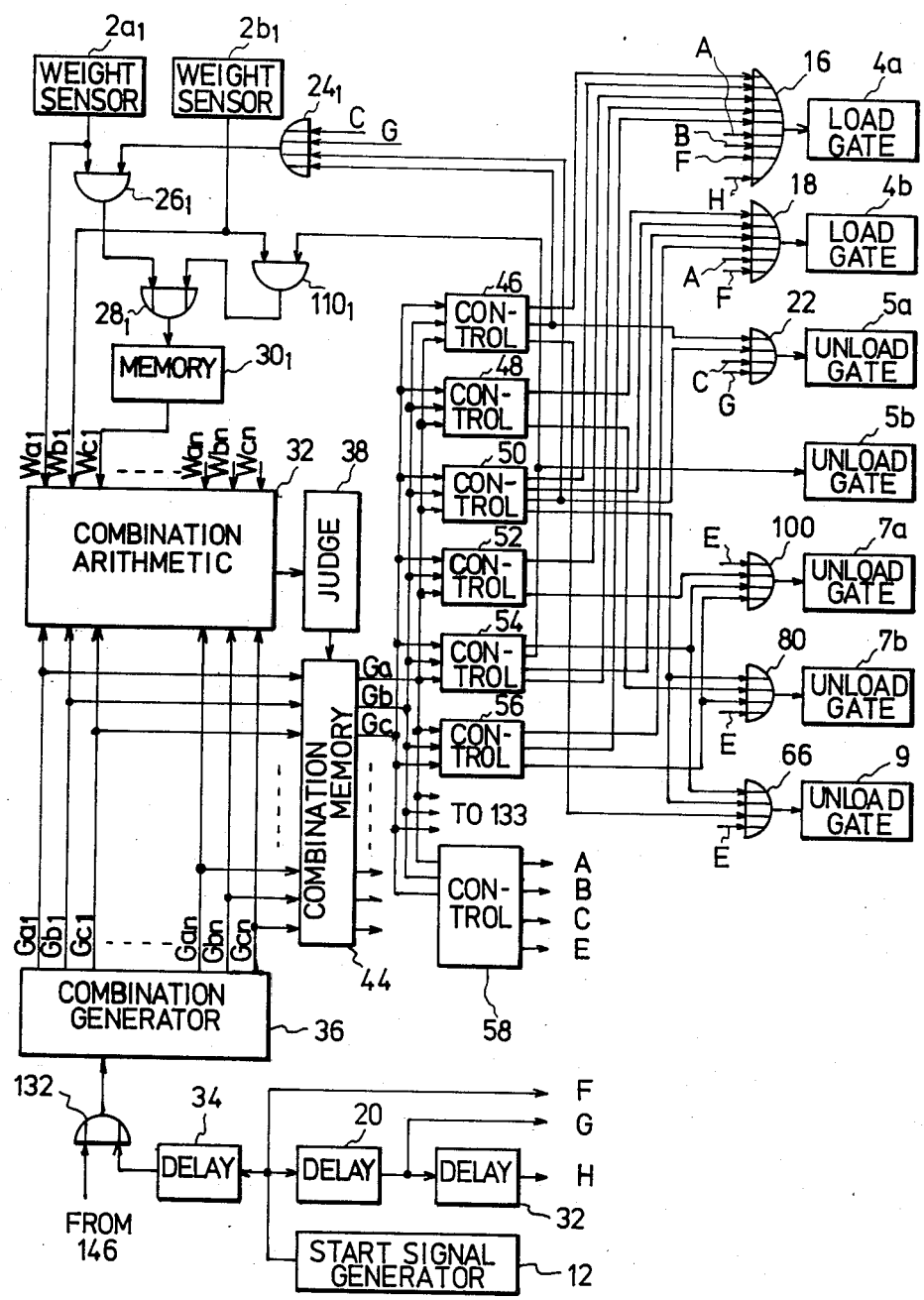
FIG. 4 is a block diagram representing a circuit configuration for the embodiment of FIG. 1.

In FIG. 1, a part of weighing hoppers 1a and 1b are provided with weight sensors 2a and 2b, respectively for sensing weights of articles therein to produce weight signals Wa$_1$ and Wb$_1$ (FIG. 4), respectively. The articles are fed into the weighing hoppers 1a and 1b from a pair of loading hoppers 3a and 3b through loading gates 4a and 4b, respectively. The contents of weighing hoppers 1a and 1b are discharged through unloading gates 5a and 5b into an auxiliary holding hopper 6, or through unloading gates 7a and 7b into a collection chute 8 (constituting a product delivery system). The content of the holding hopper 6 is discharged through an unloading gate 9 into the collection chute 8. The loading gates 4a and 4b and the unloading gates 5a, 5b, 7a, 7b and 9 are arranged to open in response to gating signals, as described later, and to close automatically after a predetermined time.

In this embodiment, as shown in FIG. 2, a plurality (n-number) of holding hoppers $6_1$, $6_2$, . . . $6_n$ are arranged circularly above the collection chute 8, and pairs of weighing hoppers $1a_1$ and $1b_1$, $1a_2$ and $1b_2$, . . . $1a_n$ and $1b_n$ are disposed above these holding hoppers, respectively, in the abovementioned operational relationship.

As shown in FIG. 3, a feeding structure comprising linear vibration feeders 10 corresponding respectively to the loading hoppers 3 and a single dispersion feeder 11 is disposed above the structure of FIG. 2 to feed the articles fed to the center of the dispersion feeder 11 automatically through the linear feeders 10 to the respective loading hoppers 3. Such feeding structure is well known in the art and disclosed, for example, in U.S. Pat. No. 4,344,392 and opened Japanese patent specification No. 57-160021. Therefore, no further description will be made thereabout.

As shown in FIG. 4, the weight signals $Wa_1$ and $Wb_1$ from weight sensors $2a_1$ and $2b_1$ are coupled directly to a combination arithmetic unit 32 and also coupled respectively through AND gates $26_1$ and $110_1$ to a common OR gate $28_1$. The output of OR gate $28_1$ is coupled to a memory $30_1$ whose output signal $Wc_1$ is coupled to combination arithmetic unit 32. Though not shown in the drawing, weight signals $Wa_2$, $Wb_2$; . . . $Wa_n$ from weight sensors $2a_2$, $2b_2$; . . . $2a_n$, $2b_n$ and weight signals $Wc_2$, . . . $Wc_n$ derived similarly from these weight signals are coupled also to the combination arithmetic unit 32. Accordingly, the number of weight signal inputs to the arithmetic unit 32 is 3n in total.

The combination arithmetic unit 32 is also provided with 3n control inputs coupled to receive 3n combination control bilevel (logic "1" or "0") signals $Ga_1$, $Gb_1$, $Gc_1$; . . . $Ga_n$, $Gb_n$, $Gc_n$ from a combination generator 36. The combination generator 36 may comprise, for example, of a 3n-bit binary counter having 3n bit outputs corresponding to $Ga_1$, $Gb_1$, $Gc_1$; . . . $Ga_n$, $Gb_n$, $Gc_n$, respectively, and providing logic "1" signals therefrom in accordance with $(2^{3n}-1)$ sets of mathematical combinations. In response to these combined output signals of the combination generator 36, the combination arithmetic unit sums the incoming weight signals to provide successively sum weight signals to a judge unit 38. The judge unit 38 compares the incoming sum weight signals with a preset reference weight condition and provides an output signal to a combination memory 44 when the preset condition is satisfied. The combination memory 44 has 3n inputs coupled respectively to the corresponding outputs of the combination generator 36 and responds to the output signal of the judge unit 38 to store the current combined input signals. Such combination selecting arrangement is common to all combination weighing machines and described in more detail in the aforementioned publications.

As described above, the combination arithmetic unit 32 receives n trios of weight signals and corresponding n trios of control signals. However, the circuits relating to the respective trios are essentially the same in both configuration and operation and, therefore, the circuit relating to a single trio will be described below for the purpose of simplification. The numerical suffixes indicative of specific trios will be omitted for the same reason.

The control signals Ga, Gb and Gc stored in the combination memory 44 are coupled to control circuits 46, 48, 50, 52, 54, 56 and 58 whose outputs are coupled through OR gates 16, 18, 22, 100, 80 and 66 to the loading gates 4a and 4b and the unloading gates 5a, 5b, 7a, 7b and 9, respectively, for opening the specific gates of the hoppers 3a, 3b, 1a, 1b and 6 to transfer the articles therein. A more detailed description will be made latter with reference to FIG. 5.

Figure 6:
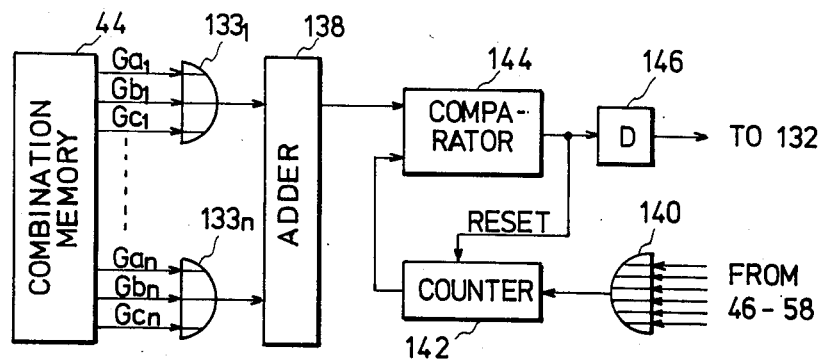
FIG. 6 is a block diagram of an operation resuming signal generator used in the circuit of FIG. 4.

As a combination generator actuating arrangement, a start signal generator 12 is coupled through a delay unit 34 and an OR gate 132 to a control input of the combination generator 36 and an operation resuming circuit as shown in FIG. 6, which will be described later, is also coupled to the other input of OR gate 132. The start signal generator 12 is also coupled directly to OR gates 16 and 18, to OR gates 16 and 22 through a delay unit 20 and to OR gate 16 through delay units 20 and 32.

Now, the operation of the arrangement of FIG. 4 will be described, assuming that, initially, the weighing hoppers 1a and 1b and the auxiliary holding hopper 6 are all empty, while the loading hoppers 3a and 3b are filled with articles. If an operator actuates the start signal generator 12, such as push-button starter, to produce a start pulse F, this pulse F is applied through OR gates 16 and 18 to loading gates 4a and 4b, respectively. Therefore, the contents of loading hoppers 3a and 3b are discharged into weighing hoppers 1a and 1b, respectively, and the hoppers 3a and 3b are loaded automatically again by the above-described feeding structure of FIG. 3. Then, the weight sensors 2a and 2b sense the weights of the contents of weighing hoppers 1a and 1b to produce corresponding weight signals. After a suitable delay provided by delay unit 20, a delayed pulse G is applied through OR gate 22 to 4a and unloading gate 5a. Therefore, the gate 5a is opened and the content of weighing hopper 1a is discharged into holding hopper 6. At the same time, the delayed pulse G is applied through OR gate 24 to AND gate 25 to open it, and the weight signal from sensor 2a is supplied through AND gate 26 to memory 30. After another suitable delay provided by a delay unit 32, a further delayed pulse H is applied through OR gate 16 to loading gate 4a, and the content of loading hopper 3a is transferred to weighing hopper 1a. Thus, the trio of weight signals Wa, Wb and Wc are now supplied to the combination arithmetic unit 32 from weight sensors 2a and 2b and memory 30, respectively.

After a suitable delay time from initiation of start pulse F and all the weight signals supplied to the combination arithmetic unit 32 have become stable, an output pulse is applied from delay unit 34 through OR gate 132 to combination generator 36 to start its operation. Thus, a combination selecting operation is effected as aforementioned and information with respect to the selected combination composed of n trios of bilevel signals Ga, Gb and Gc is delivered from combination memory 44. As to the status of each signal, there are seven active combinations as listed below.

| CASE | Ga | Gb | Gc |
| --- | --- | --- | --- |
| (1) | 0 | 0 | 1 |
| (2) | 0 | 1 | 0 |
| (3) | 0 | 1 | 1 |
| (4) | 1 | 0 | 0 |

| CASE | Ga | Gb | Gc |
|---|---|---|---|
| (5) | 1 | 0 | 1 |
| (6) | 1 | 1 | 0 |
| (7) | 1 | 1 | 1 |

As described above, Ga, Gb and Gc correspond respectively to hoppers 1a, 1b and 6 and those hoppers corresponding to logic level "1" are to be unloaded.

Figure 5:
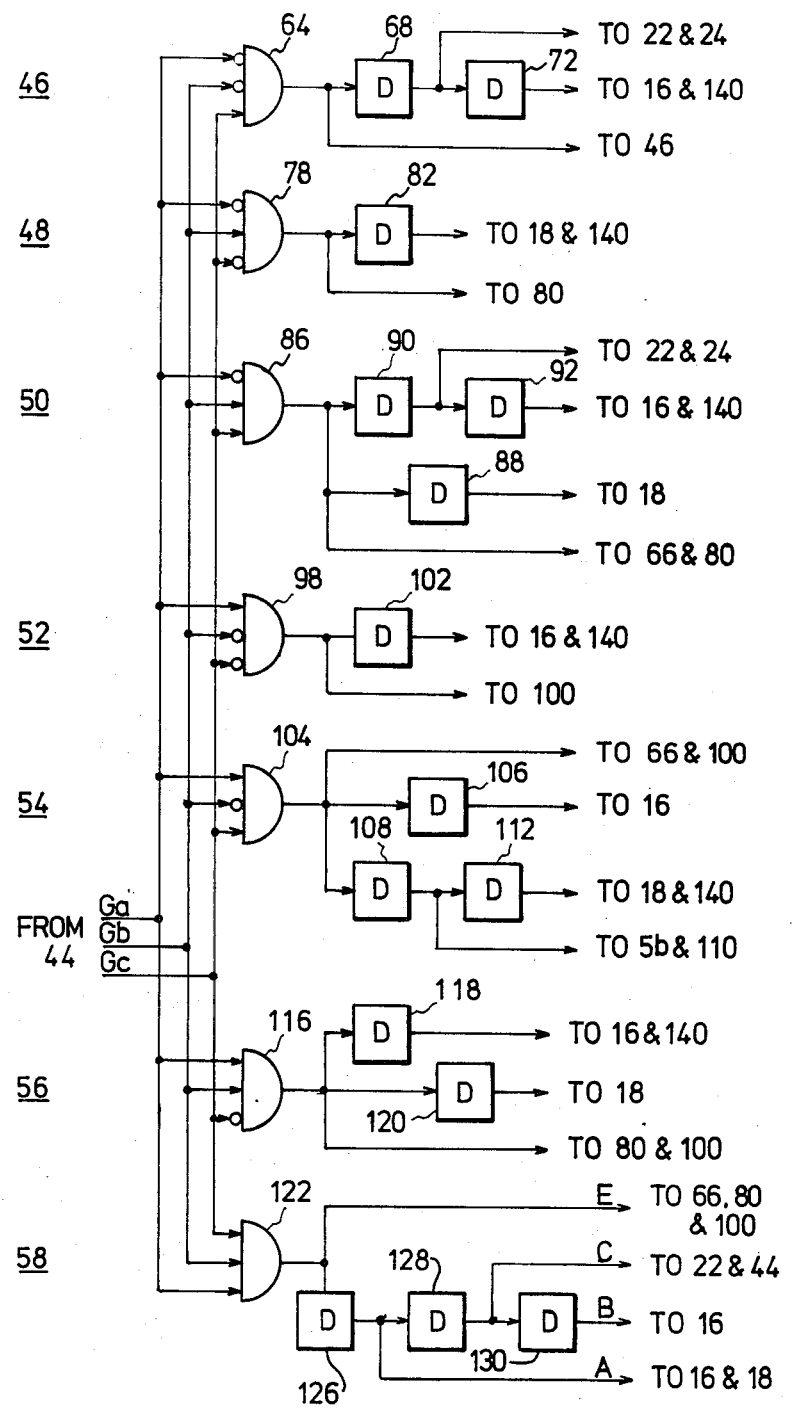
FIG. 5 is a logic circuit diagram of the control circuits appearing in FIG. 4.

Now, the operation of control circuits 46 through 58 will be described in conjunction with each of the above cases (1) through (7). As shown in FIG. 5, each control circuit has an AND gate 64, 78, 86, 98, 104, 116 or 122 coupled to receive the control signals Ga, Gb and Gc from combination memory 44 and one or two inputs thereof are inverted excepting AND gate 122.

CASE (1)

As directly understood from FIG. 5, only the AND gate 64 of control circuit 46 produces a logic "1" signal. This signal is applied first through OR gate 66 to unloading gate 9 to unload the selected hopper 6. After a suitable delay provided by delay unit 68, the logic "1" signal is applied to unloading gate 5a through OR gate 22 and to AND gate 26 through OR gate 24, thereby discharging the content of weighing hopper 1a into holding hopper 6 and also transferring the corresponding weight signal to weight sensor 2a to memory 30 through gates 26 and 28. After a further suitable delay provided by delay unit 72, the signal "1" is applied to loadng gate 4a through OR gate 16 and to OR gate 140 (FIG. 6), thereby transferring the content of loading hopper 3a to weighing hopper 1a to restore the initial condition of the trio.

The function of the signal "1" applied to OR gate 140 of FIG. 6 will be described later.

CASE (2)

Only the AND gate 78 of control circuit 48 produces a logic "1" signal in this case. This signal is applied first to unloading gate 7b through OR gate 80 to discharge the content of weighing hopper 1b into collection chute 8. After a suitable delay provided by delay unit 82, the signal "1" is applied through OR gate 18 to loading gate 4b to discharge the content of loading hopper 3b into the unloaded weighing hopper 1b, thereby restoring the initial condition. Then, the signal "1" is also applied to OR gate 140 for the purpose as described later.

CASE (3)

Only the AND gate 86 of control circuit 50 produces a logic "1" signal in this case. This signal is applied first to unloading gates 7b and 9 through OR gates 80 and 66, respectively, to discharge the contents of selected hoppers 1b and 6 into collection chute 8. After a suitable delay provided by delay unit 88, the signal is applied to loading gate 4b through OR gate 18 to reload weighing hopper 1b with the content of loading hopper 3b. At about the same time, the signal delayed by delay unit 90 is applied through OR gates 22 and 24 to unloading gate 5a and AND gate 26, respectively, to transfer the content of weighing hopper 1a into unloaded holding hopper 6 and, at the same time, to transfer the corresponding weight signal from weight sensor 2a to memory 30 through gates 26 and 28. After a further delay provided by delay unit 92, the signal "1" is applied to loading gate 4a through OR gate 16 to fill the empty weighing unit 1a with the content of loading hopper 3a.

Thus, the initial condition of the trio hoppers is restored. Similarly, the signal "1" is also applied to OR gate 140 of FIG. 6.

CASE (4)

Only the AND gate 98 of control circuit 52 produces a logic "1" signal in this case. This signal is applied through OR gate 100 to unloading gate 7a to discharge the content of selected weighing hopper 1a into collection chute 8. After a suitable delay provided by delay unit 102, the signal is also applied to loading gate 4a through OR gate 16 and to OR gate 140 (FIG. 6), thereby discharging the content of loading hopper 3a into weighing hopper 1a to restore the initial condition.

CASE (5)

Only the AND gate 104 of control circuit 54 produces a logic "1" signal in this case. This signal is applied first through OR gates 100 and 66 to unloading gates 7a and 9, respectively, to discharge the contents of selected hoppers 1a and 6 into collection chute 8. After a suitable delay provided by delay unit 106, the signal "1" is applied through OR gate 16 to loading gate 4a to fill the unloaded weighing unit 1a with the content of loading hopper 3a. At about the same time, the signal "1" delayed by delay unit 108 is applied directly to unloading gate 5b and to AND gate 110, thereby transferring the content of weighing hopper 1b into empty holding hopper 6 and also transferring the corresponding weight signal from weight sensor 2b through gates 110 and 28 to memory 30. After a further delay provided by delay unit 112, the signal "1" to applied to loading gate 4b through OR gate 18 and, similarly, to OR gate 140 (FIG. 6), thereby filling empty weighing hopper 1b with the content of loading hopper 3b. Thus, the initial condition is restored.

CASE (6)

In this case, only the AND gate 116 of control circuit 56 produces a logic "1" signal. This signal is applied first through OR gates 100 and 80 to unloading gates 7a and 7b to discharge the contents of both weighing hoppers 1a and 1b into collection chute 8. After a suitable delay provided by delay unit 118, the signal "1" is applied through OR gates 16 and 18 to loading gates 4a and 4b, respectively, to fill the weighing hoppers 1a and 1b with the contents of loading hoppers 3a and 3b, respectively, to restore the initial condition. After a suitable delay provided by delay unit 120, the signal "1" is also applied to OR gate 140 of FIG. 6.

CASE (7)

In this case, only the AND gate 122 of control circuit 58 produces a logic "1" signal. This signal, referred to as "E", is applied through OR gates 100, 80 and 66 to unloading gates 7a, 7b and 9 to discharge the contents of selected trio hoppers 1a, 1b and 6 into collection chute 8. After a suitable delay provided by delay unit 126, the delayed signal "1", referred to as "A", is applied through OR gates 16 and 18 to loading gates 4a and 4b to re-load the empty weighing hoppers 1a and 1b with the contents of loading hoppers 3a and 3b, respectively. After an additional delay provided by delay unit 128, the delayed signal, referred to as "C" is applied to unloading gate 5a and AND gate 26 through OR gates 22 and 24, respectively, thereby transferring the content of weighing hopper 1a to holding hopper 6 and, at the same time, the corresponding weight signal from weight sensor 2a to memory 30 through gates 26 and 28. After a further delay provided by delay unit 130, the delayed signal, referred to as "B" is applied through OR gate 16 to loading gate 4a to fill the discharged weighing hopper 1a with the content of loading hopper 3a, to restore the initial condition. The signal B is also applied to OR gate 140 of FIG. 6.

As appreciated from the above descrition, one of the control circuits 46, 48, 50, 52, 54, 56 and 58 is sure to provide a logic "1" signal to OR gate 140 in the circuit of FIG. 6, when at least one of the trio of hoppers 1a, 1b, 6 is selected for combination. Accordingly, a counter 142 coupled to count the output signals of OR gate 140 will count the number of trios including at least one selected hopper. On the other hand, in FIG. 6, n trios of output signals of combination memory 44 are applied respectively to n OR gates $133_1$ through $133_n$ whose outputs are coupled to an adder 138 for summing the incoming "1" signals. Since each OR gate 133 provides a logic "1" signal to adder 138 when at least one of its trio inputs is "1", the adder 138 produces an output signal indicative of the number of trios including at least one signal "1" which corresponds to a specific hopper selected for combination. A comparator 144 having the outputs of adder 138 and counter 142 as its inputs is arranged to produce an output pulse when the both inputs coincide. Accordingly, the output pulse of comparator 144 indicates completion of each cycle of combination selecting operation. This output pulse is applied to counter 142 as its reset pulse and, at the same time, delayed suitably by delay unit 146 and applied through OR gate 132 (FIG. 4) to combination generator 36 to resume its operation for next cycle.

Figure 7:
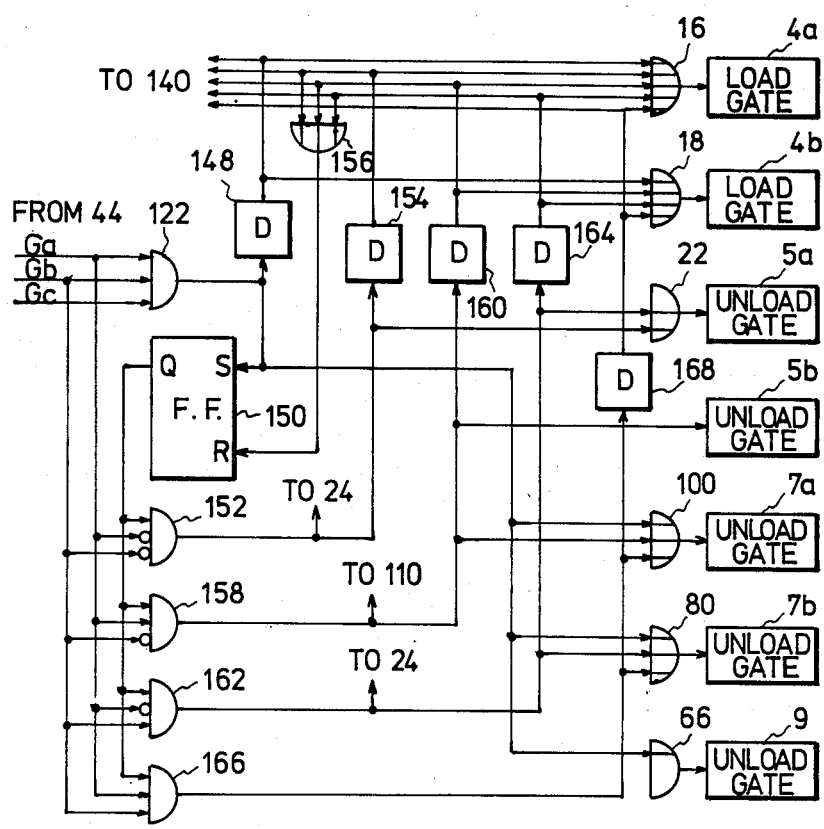
FIG. 7 is a block diagram of a circuit configuration of a part of another embodiment of this invention.

In Case (1) above, weighing hoppers 1a and 1b and holding hopper 6 are reloaded after they are ununloaded and, therefore, it takes a relatively long time before initiation of the next cycle of combination selecting operation. FIG. 7 is another embodiment of control circuit 58 arranged to reduce this time. In this circuit, the logic "1" signal output of AND gate 122 is applied through OR gates 100, 80 and 66 to unloading gates 7a, 7b and 9, respectively, to discharge the contents of hoppers 1a, 1b and 6 into collection chute 8. After a suitable delay provided by a delay unit 148, the signal "1" is applied through OR gates 16 and 18 to loading gates 4a and 4b, respectively, to reload weighing hoppers 1a and 1b with the contents of loading hoppers 3a and 3b, respectively. The output signal of delay unit 148 is also applied to OR gate 140 of FIG. 6. Accordingly, the next cycle of operation is initiated before holding hopper 6 is reloaded. Thus, the lengthy unloading and loading time is substantially reduced. The output signal "1" is further applied to set input S of a flip-flop circuit 150 to set it to provide a logic "1" signal from its Q output to AND gates 152, 158, 162 and 166. The next combination selecting operation will result in one of four possible states of combination of weighing hoppers 1a and 1b, as described below.

In the first state in which both weighing hoppers 1a and 1b are not included in the selected combination, AND gate 152 produces a logic "1" signal which is applied through OR gate 22 to unloading gate 5a to transfer the content of weighing hopper 1a to holding hopper 6, and also applied through OR gate 24 to AND gate 26 to transfer the corresponding weight signal to memory 30 through gates 26 and 28 (see, FIG. 4). After a suitable delay provided by delay unit 154, the signal "1" is applied through OR gate 16 to loading gate 4a to fill the unloaded weighing hopper 1a with the content of loading hopper 3a, and also applied through OR gate 156 to reset input R of flip-flop circuit 150 to reset it. The output of delay unit 154 is also coupled to OR gate 140 of FIG. 6 and, thus, the succeeding cycle of operation is initiated under normal condition in which all the trio hoppers 1a, 1b and 6 are filled with articles.

In the second state in which only weighing hopper 1a is included in the selected combinatiuon, AND gate 158 produces a logic "1" signal which is applied to unloading gates 7a and 5b to discharge the content of selected weighing hopper 1a into collection chute 8 and, at the same time, to transfer the content of non-selected weighing hopper 1b to empty hlding hopper 6. At the same time, the signal "1" is also applied to AND gate 110 (FIG. 4) to transfer the corresponding weight signal from weight sensor 2b to memory 30 through gates 110 and 28. After a suitable delay provided by delay unit 160, the signal "1" is further applied through OR gates 16 and 18 to loading gates 4a and 4b to transfer the contents of loading hoppers 3a and 3b to the unloaded weighing hoppers 1a and 1b, respectively, and also through OR gate 156 to reset input R of flip-flop 150 to reset it. The output signal of delay unit 160 is also applied to OR gate 140 of FIG. 6, so that the succeeding cycle of operation is initiated under normal condition as abovementioned.

In the third state in which only weighing hopper 1b is included in the selected combination, AND gate 162 produces a logic "1" signal which is applied through OR gates 80 and 22 to unloading gates 7b and 5a to discharge the content of selected weighing hopper 1b into collection chute 8 and, at the same time, to transfer the content of non-selected weighing hopper 1a to empty holding hopper 6. At the same time, the signal "1" is also applied through OR gate 24 to AND gate 26 (FIG. 4) to transfer the corresponding weight signal from weight sensor 2a to memory 30 through gates 26 and 28. After a suitable delay provided by delay unit 164, the signal "1" is applied through OR gates 16 and 18 to loading gates 4a and 4b to fill the unloaded weighing hoppers 1a and 1b with the contents of loading hoppers 3a and 3b, respectively, and also through OR gates to reset input R of flip-flop 150 to reset it. The output signal of delay unit 164 is further applied to OR gates 140 of FIG. 6 to initiate the succeeding cycle of operation under normal condition.

In the fourth state in which both weighing hoppers 1a and 1b are included in the selected combination, AND gate 166 produces a logic "1" signal which is applied through OR gates 100 and 80 to unloading gates 7a and 7b to discharge the contents of selected weighing hoppers 1a and 1b into the collection chute. After a suitable delay provided by delay unit 168, the signal "1" is applied through OR gates 16 and 18 to loading gates 4a and 4b to re-load empty weighing hoppers 1a and 1b with articles from loading hoppers 3a and 3b, respectively. The output signal of delay unit 168 is also applied to OR gate 140 of FIG. 6 and, therefore, the succeeding cycle of operation is initiated under normal condition.

Figure 8:
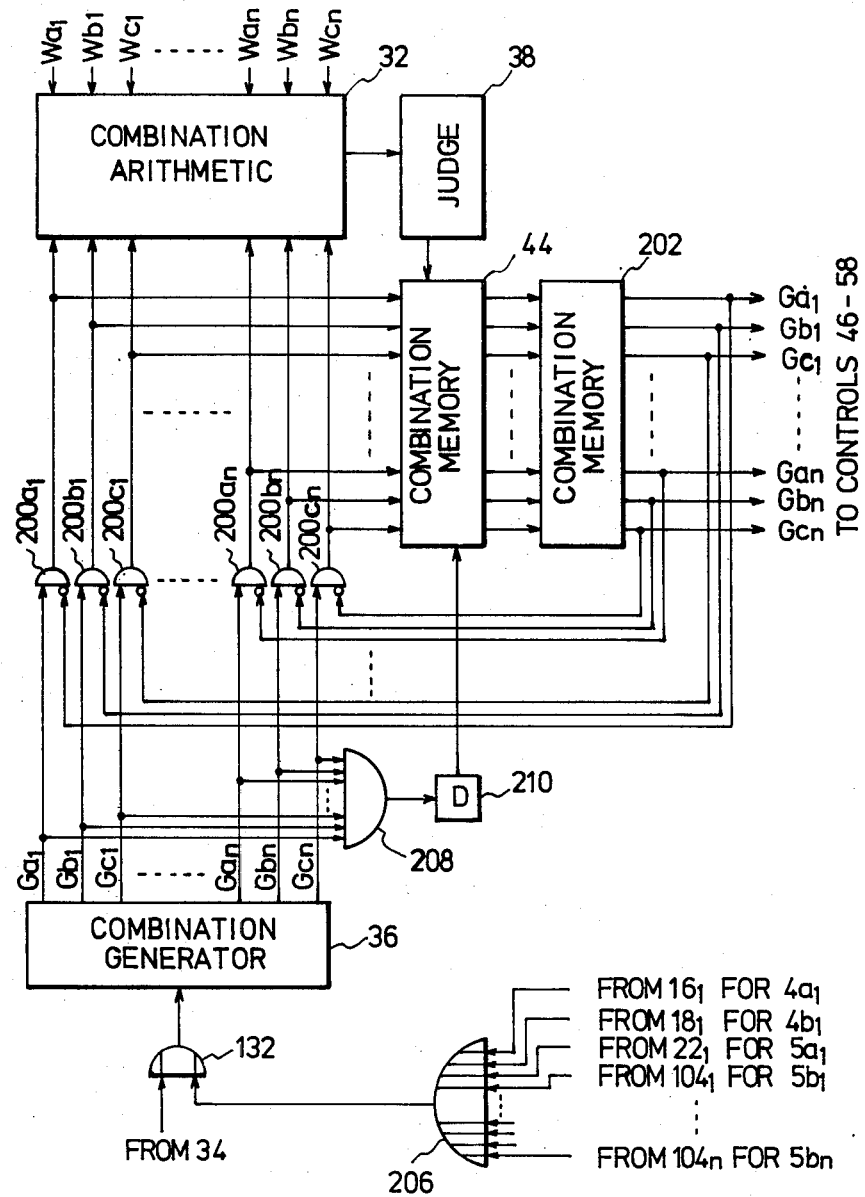
FIG. 8 is a block diagram of a circuit configuration of a part of a further embodiment of this invention.

U.S. Pat. No. 4,385,671 discloses a combination weighing system, a so-called "double shift system", including means for inhibiting participation in the next combination selecting operation those weighing hoppers selected for the current combination and initiating the next operation before the unloading and loading operation of these hoppers is completed, thereby improving working efficiency of the system. FIG. 8 shows a third embodiment of this invention in which the principle of this patent is applied. In this system, the outputs $Ga_1, Gb_1, Gc_1; \ldots Ga_n, Gb_n, Gc_n$ are coupled to control inputs of combination arithmetic unit 32 through AND gates $200a_1, 200b_1 200c_1; \ldots 200a_n, 200b_n, 200c_n$, respectively. The second inputs of these AND gates 200 are inverted. The outputs of combination memory 44 are coupled through another combination memory 202 to control circuits 46 through 58 (FIG. 4) and combination memory 202 is arranged to deliver output signals until the corresponding weighing hoppers are completely loaded again and become stable. The outputs of combination memory 202 are also coupled respectively to inverted inputs of AND gates 200. All outputs of combination generator 36 are also coupled to AND gate 208 whose output is applied through a delay unit 210 to a second control input of combination memory 44. When combination generator 36 is composed of a 3n-bit binary counter as aforementioned, all outputs thereof provide logic "1" signals at the end of operation. At this time, therefore, AND gate 208 produces an output signal which is delayed suitably by delay unit 210 and applied to combination memory 44 to cause it to deliver its content. Thus, the selected hoppers are unloaded and loaded under control of control circuits 46 through 58, but corresponding ones of AND gates 200 are closed by the selected outputs of combination memory 202 to inhibit corresponding outputs of combination generator 36 from controlling combination arithmetic unit 32, that is, to inhibit the selected hoppers from participating in the next combination selecting operation. On the other hand, the output signals of OR gates 16, 18 and 22 (FIG. 4) and AND gate 104 (FIG. 5) for actuating loading gates 4a and 4b and unloading gates 5a and 5b are coupled through OR gate 206 to OR gate 132 for starting combination generator 36. Accordingly, the next combination selecting operation is initiated immediately without awaiting completion of unloading and loading of the selected hoppers. This can result in significant reduction of cycle time and consequent improvement of working efficiency.

It should be noted that the above description has been made for illustrative purpose only and various modifications and changes may be made within the scope of this invention. For example, the number of weighing hoppers common to each auxiliary holding hopper can be selected arbitrarily, other than two.

It will be understood from the foregoing that a combination weighing machine of the present invention comprises a plurality of sets of what may generally be referred to as weighing means, each such set comprising a single holding hopper (e.g., 6) and a plurality of weighing units (e.g., 1a and 1b). As noted above, the number of weighing units in each set may vary.

We claim:

1. A combination weighing machine, comprising a plurality of weighing units each adapted for weighing product and producing a weight signal indicative of the weight thereof, a plurality of auxiliary holding hoppers for receiving and holding product weighed by said weighing units, a plurality of memories associated with respective holding hoppers for storing the weight signals corresponding to the contents of said hoppers, means for combining the weight signals from said weighing units and said memories to select a combination of weight signals whose sum satisfies a predetermined weight condition, means for unloading the weighing hoppers and/or holding hoppers corresponding to said selected weight signals, and transfer means responsive to the unloading of said holding hoppers for transferring thereto product from said weighing hoppers and for writing the weight signals of said product in the memories of respective holding hoppers; characterized in that each of said holding hoppers is adapted to receive and hold product from at least two weighing units, and said transfer means is responsive to the unloading of a holding hopper for transferring product thereto from either one of said two weighing units.

2. A combination weighing machine, according to claim 1, characterized by further comprising means for temporarily inhibiting the weights of product from those weighing units and/or holding hoppers which have been unloaded by said unloading means from being used in said combination selecting means, and re-starting the operation of said combination selected means before completion of the re-loading operation for said unloaded weighing units and/or holding hoppers.

3. A method of delivering quantities of product each having a predetermined weight, using a combination weighing machine comprising a plurality of weighing units, a plurality of holding hoppers each belonging to two of said weighing units for holding the product weighed by one of said two weighing units, memories corresponding to said holding hoppers for storing the weights of their contents respectively, means for calculating combinations of the weights from said weighing units and said memories and then selecting a combination satisfying a predetermined weight condition, and means for unloading and re-loading those of said weighing units and/or holding hoppers corresponding to said selected combination; characterized in that, after said weighing units and/or holding hoppers corresponding to said selected combination have been unloaded,
(a) if at least one of the two weighing units to which a specific filled holding hopper belongs is empty, said combination calculating operation is re-started after said empty weighing unit is re-loaded,
(b) if at least one of the two weighing units to which a specific empty holding hopper belongs is left filled, and combination calculating operation is re-started after the content of said filled weighing unit is transferred to said specific empty holding hopper and then the resulting empty weighing unit is re-loaded, and,
(c) if both of two weighing units to which a specific empty holding hopper belongs are empty, said combination calculating operation is re-started after said two weighing units are re-loaded.

4. The method according to claim 3, characterized in that, before completion of the unloading and re-loading operations for the weighing units and/or holding hoppers corresponding to said selected combination, the next combination calculating operation is re-started with the weights other than those relating to said selected weighing units and/or holding hoppers.

5. A combination weighing machine comprising:
a plurality of pairs of weighing units, each weighing unit being adapted for weighing product to arrive at a weight value indicative of the weight of product in the unit and each having outlet means for unloading of product from the unit;
a plurality of auxiliary holding hoppers, one hopper for each pair of weighing units, mounted below respective pairs of weighing units for receiving and holding product unloaded from respective weighing units, each hopper having outlet means for unloading of product from the hopper;

a memory associated with each holding hopper for storing the weight value of product unloaded from a respective weighing unit into the hopper;

means for combining the weight values of product in said weighing units and said holding hoppers to select a combination weight satisfying a predetermined weight condition;

means for unloading those weighing units and/or holding hoppers corresponding to said selected combination; and means responsive to the unloading of a holding hopper for effecting unloading of product from one weighing unit of a respective pair of units into the holding hopper to reload it, and for writing into the memory associated with said holding hopper the weight value of product unloaded from said weighing unit into the hopper.

6. A combination weighing machine as set forth in claim 5 further comprising chute means for conveyance of product from the machine, said output means of each weighing unit comprising a first outlet for unloading of product from the unit into a respective holding hopper, and a second outlet for unloading of product from the unit to said chute means.

7. A combination weighing machine comprising a plurality of sets of weighing means, each set comprising a holding hopper and a plurality of weighing units, each weighing unit of the set being adapted for weighing product to arrive at a weight value indicative of the weight of product in the unit, said holding hopper of each set being adapted for receiving and holding product unloaded from the weighing units of the set, a memory associated with each holding hopper for storing the weight value of product unloaded from a respective weighing unit into the hopper, the holding hopper of each set having means for discharging product held therein to a product delivery system, each weighing unit of the set having outlet means for discharging product weighed therein either into said holding hopper for loading the hopper or into said product delivery system bypassing the hopper, and means operable on the unloading of the hopper of each set for effecting operation of the outlet means of a weighing unit of the respective set to deliver its content into the weighing hopper.

* * * * *

UNITED STATES PATENT AND TRADEMARK OFFICE
CERTIFICATE OF CORRECTION

PATENT NO. : 4,618,012

DATED : October 21, 1986

INVENTOR(S) : Shoji Yamano, Yoshitaka Mikata, Osamu Teramoto and Kazuhiro Nishide It is certified that error appears in the above—identified patent and that said Letters Patent is hereby corrected as shown below:

Abstract, line 2, "which is" should read --typically--; lines 2-3, "used typically for packing a plurality of articles in each bag" should read --used for packing articles in bags--; line 4, "so as to render the" should read --so that the--; lines 4-5, "bag to satisfy a" should read --bag satisfies a--; line 5, "weight condition, including" should read --weight condition. The machine includes--; line 6, "weighing the articles" should read --weighing articles,--; line 7, "each at the same time, arithmetic means" should read --an arithmetic unit--; line 8, "some of these units the total weight of which satisfies" should read --a group of weighing units having a total weight satisfying--; line 9, "and means" should read --and a mechanism--; line 11, "the articles" should read --articles--; line 11, "loading them" should read --reloading the weighing units--; line 12, "articles; each" should read --articles. Each--; lines 12-13, "being provided with a" should read --has a--; line 14, "and keeping" should read --and for holding--; line 15, "them for participating in" should read --them. The weights of the articles in the auxiliary hoppers and in the weighing units are used in--; lines 15-17, "operation together with those articles on the weighing units, thereby" should read --operation, thereby--. Column 1, line 62, "and weighing unit" should read --, each weighing unit--. Column 2, line 7, "to unload hoppers" should read --to unloaded hoppers--; line 39 ", parts" should read --, respectively,--. Column 4, line 37, "4a and unloading

UNITED STATES PATENT AND TRADEMARK OFFICE
CERTIFICATE OF CORRECTION

PATENT NO.  : 4,618,012                              Page 2 of 2
DATED       : October 21, 1986
INVENTOR(S) : Shoji Yamano, Yoshitaka Mikata, Osamu Teramoto
              and Kazuhiro Nishide It is certified that error appears in the above—identified patent and that said Letters Patent is hereby corrected as shown below:

gate" should read --unloading gate--;  line 41, "gate 25" should read --gate 26--.  Column 5, line 28, "to weight" should read --of weight--.  Column 7, line 67, "(see, Figure 4)" should read --(see Figure 4)--.  Column 8, line 15, "hlding" should read --holding--.  Column 10, claim 2, line 18, "selected" should read --selecting--;  claim 3, line 43, "and combination" should read --said combination--;  claim 3, line 46, "resulting" should read --resultant--.

Signed and Sealed this

Twenty-third Day of August, 1988

Attest:

DONALD J. QUIGG

*Attesting Officer*  *Commissioner of Patents and Trademarks*